Dec. 5, 1939.     G. R. BRENT     2,182,716
COOLING AND AIR CIRCULATING ATTACHMENT FOR AUTOMOBILES
Filed Jan. 26, 1939
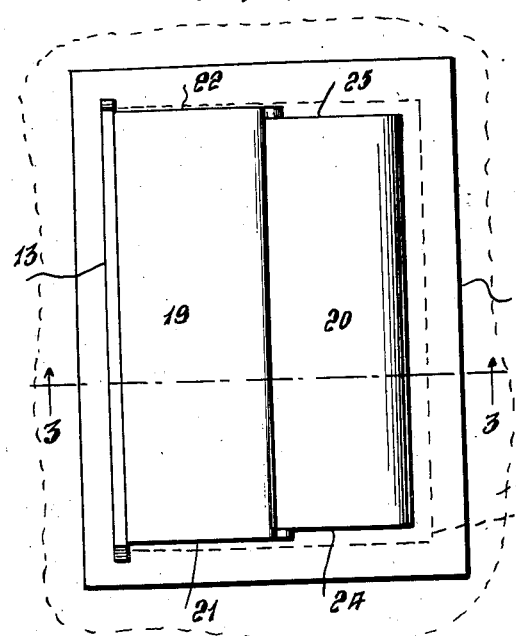
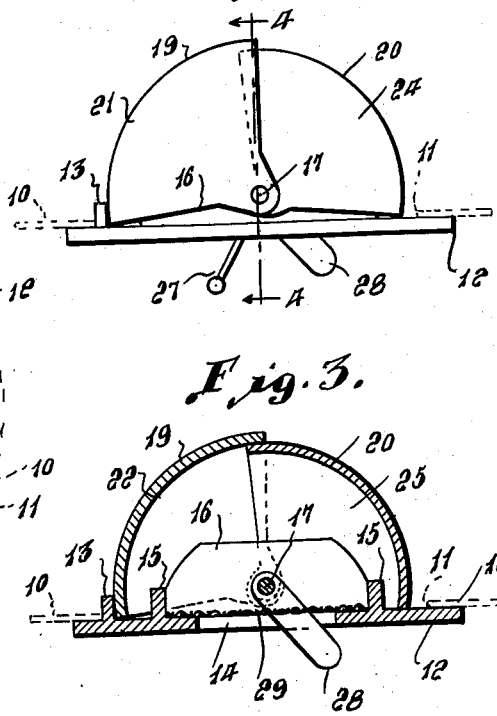
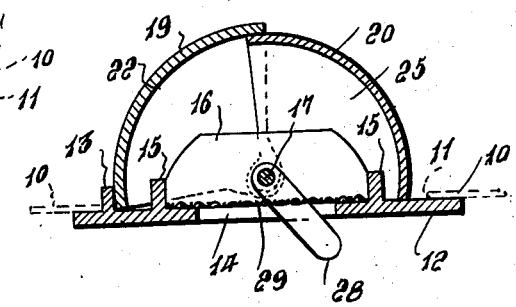
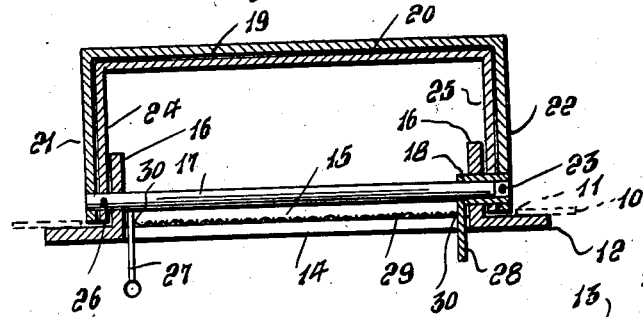
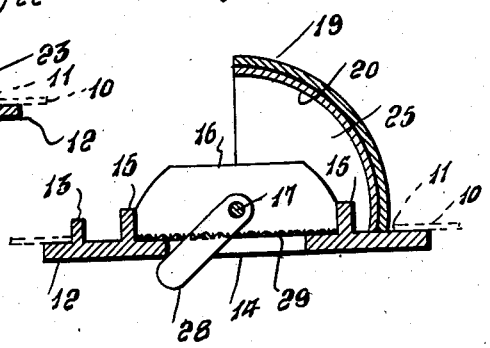
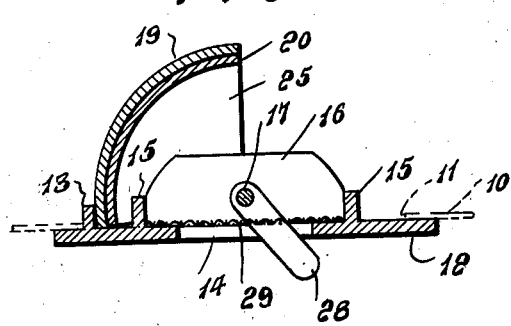
Inventor
George R. Brent
By L. F. Rawruph
Attorney Patented Dec. 5, 1939

2,182,716

UNITED STATES PATENT OFFICE 2,182,716

COOLING AND AIR CIRCULATING ATTACHMENT FOR AUTOMOBILES

George R. Brent, Beaumont, Tex.

Application January 26, 1939, Serial No. 253,015

4 Claims. (Cl. 98—8)

This invention relates to an attachment for automobiles and is designed to ventilate the interior of a vehicle, preferably through the top or roof of the automobile, by either forcing the air in or exhausting the air therefrom as may be desired by the owner.

The more specific objects and advantages will become apparent from a consideration of the description following taken in connection with accompanying drawing illustrating an operative embodiment.

In said drawing—

Figure 1 is a plan view of the device;

Figure 2 is an end elevation showing the same in place;

Figure 3 is a cross sectional view taken on the line 3—3 of Figure 1;

Figure 4 is a longitudinal sectional view taken on the line 4—4 of Figure 2;

Figure 5 is a view similar to Figure 3 with the parts in one adjusted or open position, and Figure 6 is a view similar to Figure 5 with the parts in the other open or adjusted position.

Referring specifically to the drawing wherein like reference characters designate like or similar parts, the invention may be applied at any desired location on an automobile or closed vehicle but is preferably located at an opening in the roof or top of an automobile, such top or roof being generally indicated as at 10 and the opening as at 11. The invention comprises a base plate 12 for instance of metal which is fastened in a water-tight manner to the roof or cover 10, a flange 13 being provided on such plate 12 for entry into the opening 11 to aid in the positioning of the device.

Said plate 12 has an air passage or opening 14 therethrough and on opposite sides of which ribs 15 extend longitudinally and which ribs are joined by vertical walls 16.

Journaled in one of the walls 16 is one end of a shaft 17. Such shaft at its other end is journaled in a short tube or hollow shaft 18 which in turn is journaled in the other wall 16.

Two segmental hood sections are provided at 19 and 20 adapted to close the opening 14 as in the position of Figures 1 to 4 or for folding together as in Figures 5 and 6, respectively, according to the path which it is desired that the air should take. To this end, end plates 21 and 22 on the section 19, respectively, loosely engage shaft 17 and are riveted or otherwise rigidly fastened to the hollow shaft 18 as at 23. Segment or section 20 is smaller than the section 19, having end plates 24 and 25, respectively, riveted or otherwise rigidly fastened as at 26 to the shaft 17 and loosely surrounding the hollow shaft 18.

An operating crank or handle 27 depends rigidly from the shaft 17 through the opening 14 into the interior of the vehicle and a depending crank or handle 28 extends from the tubular shaft 18 through the opening 14 into the interior of the vehicle.

A screen 29 may be disposed on the plate 12 to cover the opening 14, being surrounded by the ribs 15 and walls 16, the screen 29 being cut away adjacent the cranks 27 and 28 as at 30, to facilitate their operation.

It will thus be seen that the sections or segments 19 and 20 may be in the position of Figures 1 to 4, wherein the top of the automobile will be closed. The vehicle will be assumed to be moving toward the left as shown in the drawing so that should it be desired to cool or circulate air within the vehicle, crank 28 will be operated to place the sections in the position of Figure 5 and fresh air will be directed into the vehicle. By operating the other crank 27 the sections will be in the position of Figure 6, and the air will be drawn out of the vehicle by the suction caused by the rush of the atmosphere past the hood sections.

It will be seen especially from Figures 2 and 3, that the peripheral walls of the sections 19 and 20 in their closed position overlap so as to exclude rain and the elements.

Various changes may be resorted to provided they fall within the spirit and scope of the invention.

I claim as my invention:

1. An air control attachment of the class described comprising a base plate provided with an opening, sections on the plate to close the opening, telescope shafts journaled on the plate and on each other, means fastening said shafts respectively to a different section, and means to operate the shafts to dispose the sections on either side of the axis of the shafts.

2. An air control attachment of the class described comprising a base plate provided with an opening, sections on the plate to close the opening, telescope shafts journaled on the plate and on each other, means fastening said shafts respectively to a different section, means to operate the shafts to dispose the sections on either side of the axis of the shafts, comprising a crank on each shaft, and walls on the plate in which the shafts are respectively journaled.

3. An air control attachment of the class described comprising a base plate provided with an opening, sections on the plate to close the opening, telescope shafts journaled on the plate and on each other, means fastening said shafts respectively to a different section, means to operate the shafts to dispose the sections on either side of the axis of the shafts, walls on the plate in which the shafts are respectively journaled, a screen on the plate over said opening, and ribs on the plate coacting with said walls in positioning said screen.

4. An air control attachment of the class described comprising a base plate provided with an opening, sections on the plate to close the opening, telescope shafts journaled on the plate and on each other, means fastening said shafts respectively to a different section, means to operate the shafts to dispose the sections on either side of the axis of the shafts, walls on the plate in which the shafts are respectively journaled, a screen on the plate over said opening, ribs on the plate coacting with said walls in positioning said screen, the second mentioned means comprising cranks, and said ribs and walls being integral with said plate.

GEORGE R. BRENT.